United States Patent [19]

Jamet et al.

[11] Patent Number: 5,448,015
[45] Date of Patent: Sep. 5, 1995

[54] SUPPORT AND GUIDE DEVICE FOR CABLES CARRYING ELCETRICAL OR LIGHT SIGNALS

[75] Inventors: Daniel Jamet, Nozay; Christian Guiberteau, Longjumeau; Jacques Roger, Guyancourt; Rémi Verdurand, Neuilly, all of France

[73] Assignee: Societe Anonyme Dite Alcatel Cit, Paris, France

[21] Appl. No.: 997,564

[22] Filed: Dec. 28, 1992

[30] Foreign Application Priority Data

Dec. 30, 1991 [FR] France .................... 91 16315

[51] Int. Cl.6 .............................. H02G 3/04
[52] U.S. Cl. ................ 174/68.3; 174/72 A; 174/101
[58] Field of Search ......... 174/68.3, 95, 96, 97, 174/98, 99 R, 99 E, 101; 361/826; 385/134, 135, 136, 137; 248/68.1

[56] References Cited

U.S. PATENT DOCUMENTS

| 3,082,984 | 3/1963 | Larsson et al. | 174/72 A X |
| 3,363,048 | 1/1968 | Vaughn | 248/68.1 X |
| 3,705,949 | 12/1972 | Weiss | 174/101 |
| 4,136,257 | 1/1979 | Taylor | 174/68.3 |
| 4,484,020 | 11/1984 | Loof et al. | 174/101 X |

FOREIGN PATENT DOCUMENTS

| 0187961 | 2/1956 | Austria | 361/428 |
| 1173950 | 7/1964 | Germany | 361/428 |
| 1565978 | 6/1970 | Germany . | |
| 8332257 | 1/1984 | Germany . | |
| WO9104597 | 4/1991 | WIPO . | |

Primary Examiner—Leo P. Picard
Assistant Examiner—Hyung S. Sough
Attorney, Agent, or Firm—Sughrue, Mion, Zinn, Macpeak & Seas

[57] ABSTRACT

Two identical components assembled together constitute a guide rack for optical cables fixed at the bottom of a subrack fitted with circuit boards. Optical jumpers are guided between support members and guide members. Each optical cable is easily positioned pending connection with its terminal connector part resting between two support members. This avoids tangling of the optical jumpers and ensures that any of the cables connected to the front panel of any circuit board can be replaced by the cable put into the waiting position without risk of confusion.

6 Claims, 3 Drawing Sheets

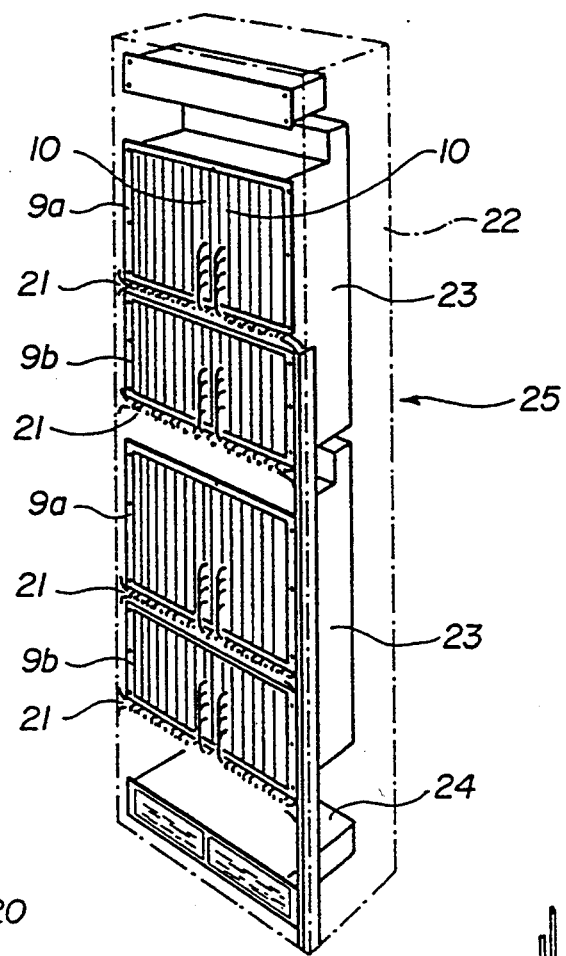
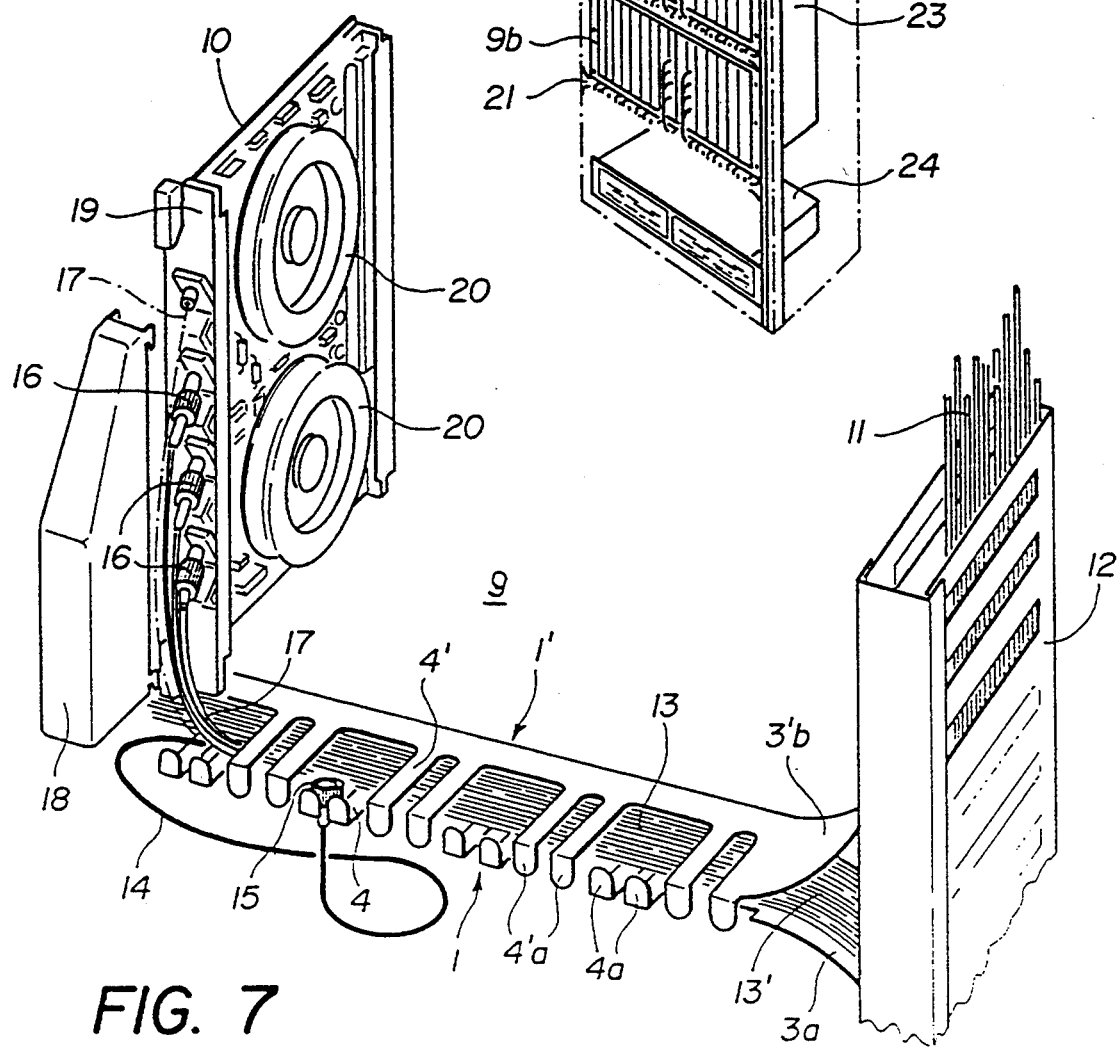
FIG. 8
FIG. 7

SUPPORT AND GUIDE DEVICE FOR CABLES CARRYING ELCETRICAL OR LIGHT SIGNALS

BACKGROUND OF THE INVENTION

1. Field of the invention

The present invention concerns a support and guide device for cables carrying electrical or light signals. The device is particularly intended to be used in telecommunication installations comprising cabinets or racks fitted with a plurality of subracks equipped with a number of removable printed circuit boards.

2. Description of the Prior Art

In such installations some connections are made via the subrack front panel and at least some circuit boards are connected to electrical or optical cables by means of connectors in two separable parts one of which is fixed to a front panel and connected to the respective circuit board and the other of which is fixed to the end of a cable carrying signals from the exterior to the board in question or from the board to the exterior.

In the places where telecommunication installations are housed, signal cables may be routed in trenches in the floor, on racks at ceiling height and in trunking running along the walls. The cabinets or racks usually receive cables in the form of bundles guided in vertical trunking from which groups of cables to feed the various subracks in the cabinet or rack are brought out at the same level as the subrack. A relatively large number of cables feeds each subrack, possibly several dozen.

During installation and also during subsequent conversion and adaptation of telecommunication installations it is usually necessary to carry out a large number of cable connection and disconnection operations and circuit board insertion and removal operations as well as to carry out work on circuit boards disposed in a subrack that is on its own or disposed above or below another subrack which may or may not be fitted with circuit boards already. During these operations a large number of cables and connectors are disconnected, pending connection, and this often causes problems of lack of space and of identifying connectors, impeding work on the circuit boards and entailing a non-negligible risk of wrong connections.

The individual conductor elements of the cables are relatively fragile, especially in the case of optical fibers, so that there is a significant risk of these elements being damaged or broken if they change direction with too small a radius of curvature, especially if the cables become tangled during the various operations carried out when installing or converting equipment.

One object of the invention is to provide a solution to the above-mentioned problems and to reduce the above-mentioned risks, in particular by improving the routing of cables between the trunking feeding the cabinets or racks and the front panels of the circuit boards, by ensuring good identification of the cables and good indexing of the connecting elements, and also by providing temporary attachment members whereby unplugged connector elements can be stowed in clearly defined waiting positions where they do not impede the connection and disconnection of other connectors or work on the circuit boards, although these elements can be located and identified correctly when they are to be plugged in, and further by guiding cables where they enter or leave the feed trunking with a radius of curvature that is always greater than the permissible lower limit.

SUMMARY OF THE INVENTION

The present invention consists in a device for supporting and guiding cables conveying electrical or light signals made up of components each comprising a series of parallel separate coplanar elongate cable support members perpendicular to the length of the component and having one end joined to a common elongate part of the component and a free end, in which device all said support members are disposed on a common side of said common part and said components are adapted to be assembled together in pairs with their respective cable support members parallel to each other.

Said components are advantageously identical and said support members are disposed asymmetrically along the length of each component relative to the center thereof so that when two components are assembled together their respective cable support members alternate.

In one particularly advantageous embodiment of the device the free ends of at least some of the cable support members comprise means for limiting natural displacement of cables disposed in the lengthwise direction of the component bearing against the part of said support members between their free end and their end joined to the common elongate part of the component.

Said component advantageously has a curved surface at one end at least.

In one particular embodiment of the device said component comprises an elongate flat longitudinal member fastened to a flat member whose central part is joined at right angles to an edge of said longitudinal member over the major part of its length and each end of which has a curved surface, said central part of said member being crenellated so as to form a series of appendages separated by gaps with an asymmetric disposition along the component relative to the center thereof.

Said appendages are advantageously associated in pairs with relatively narrow gaps between the appendages of a pair and relatively large gaps between consecutive pairs of appendages.

A length equal to the width of said longitudinal member of the free ends of said appendages is advantageously bent at right angles in the same direction as said longitudinal member to form a hook.

The invention will be clearly understood from the following detailed description of one specific embodiment of a device in accordance with the invention given by way of non-limiting example with reference to the appended diagrammatic drawings.

BRIEF DESCRIPTIONS OF THE DRAWINGS

FIG. 7 is a partial perspective view showing the use of the assembly in accordance with the invention as shown in FIGS. 4 through 6 as a guide rack for optical cables mounted on a subrack equipped with removable printed circuit boards.

FIG. 8 is a perspective view showing a cabinet containing a plurality of subracks of circuit boards equipped with a cable support and guide device in accordance with the invention.

DETAILED DESCRIPTION OF THE INVENTION

Figure 1:
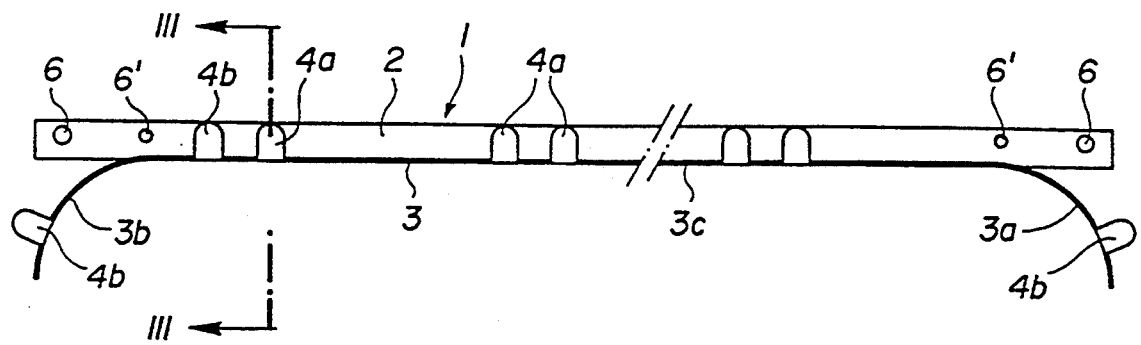
FIG. 1 is a front elevation view of a basic component which is part of a device in accordance with the invention.
Figure 2:
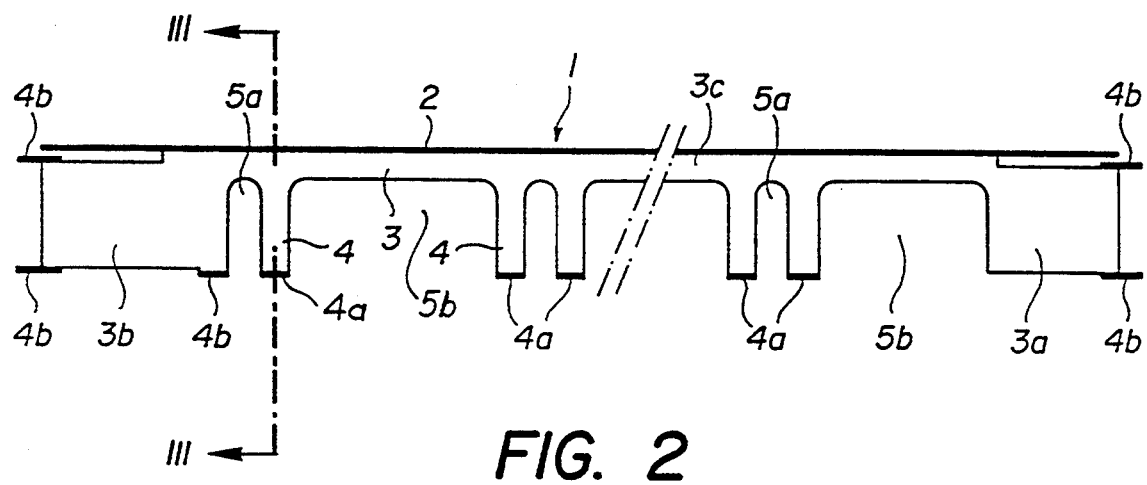
FIG. 2 is a plan view of the component shown in FIG. 1.
Figure 3:
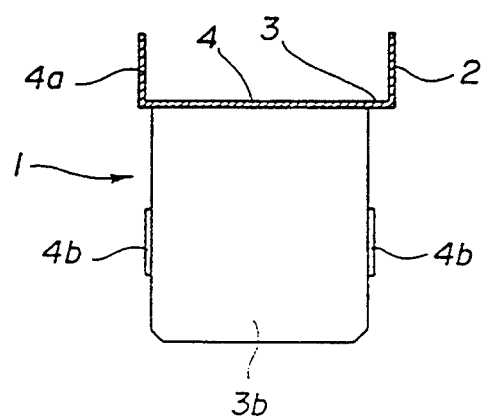
FIG. 3 is a view of the component shown in FIGS. 1 and 2 in cross-section on the line III—III in FIG. 1.

The basic component 1 of a windowed cable guide and support device shown in FIGS. 1 to 3 comprises a flat longitudinal member 2 in one piece with a flat member 3 the same thickness as the longitudinal member 2. The member 3 has a central part 3c of which one edge is joined at right angles to one edge of the longitudinal member 2 over the major part of its length and two end parts 3a and 3b separate from the longitudinal member 2 and curving away from the latter. The central part 3c of the member 3 is crenellated and has a series of flat appendages 4 associated in pairs with relatively narrow gaps 5a between the appendages 4 of a pair and relatively large gaps 5b between consecutive pairs of appendages.

The arrangement of the appendages 4 and of the gaps 5a and 5b relative to the center of the member 3 is asymmetrical. To be more precise, although a first appendage 4 is separated by a narrow gap 5a from the remainder of the central part 3c of the member 3 at one end of this member (in this example the curved end 3b), the last appendage 4 is separated by a wide gap 5b from the remainder of the central part 3c of the member 3 at the curved end 3a of this member.

The free end or lip 4a of each appendage 4 is rounded and bent at right angles to the flat member 3 on the same side of the latter as the longitudinal member 2 and over a length substantially equal to the width of the latter, forming a hook. Note that because of the rounded shape of the ends of the appendages 4 there is an upwardly diverging gap between the ends of two consecutive appendages 4 as seen in the front view shown in FIG. 1. The function of this gap will be explained later.

The lateral edges of the end parts 3a and 3b of the member 3 and the free edge of the central part 3c preceding the first appendage 4 at the end 3b of the member 3 also have rounded lips 4b bent at right angles and the same shape as the lips 4a. The function of the lips 4a and 4b will also be explained later.

Figure 6:
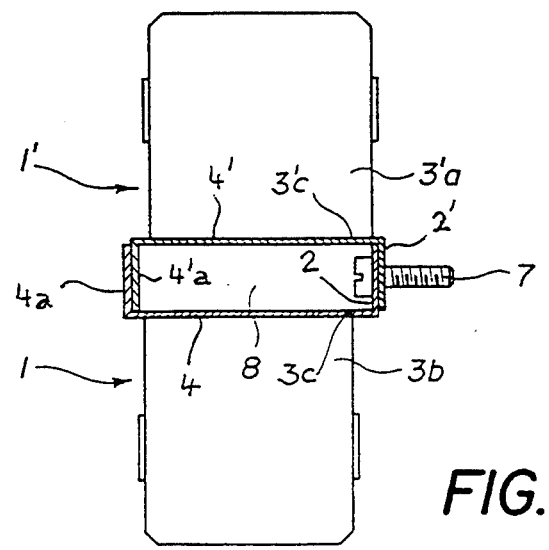
FIG. 6 is a view of the assembly shown in FIGS. 4 and 5 in cross-section on the line VI—VI in FIG. 4.

Cylindrical holes 6 and 6' of different diameter are provided in the longitudinal member 2 for fixing screws 7 (one of which is shown in FIG. 6) adapted to cooperate with appropriate means fitted either to the rack or to the subrack at a level such that the fixing and positioning of the device in accordance with the invention do not impede the insertion or removal of printed circuit boards. Said device is advantageously disposed at a level below the lower edge of any front panels of the circuit boards.

The component 1 is advantageously punched and bent galvanized steel or bronze. It may instead be made from any other appropriate material, for example it may be molded from a rigid plastics material.

Figure 4:
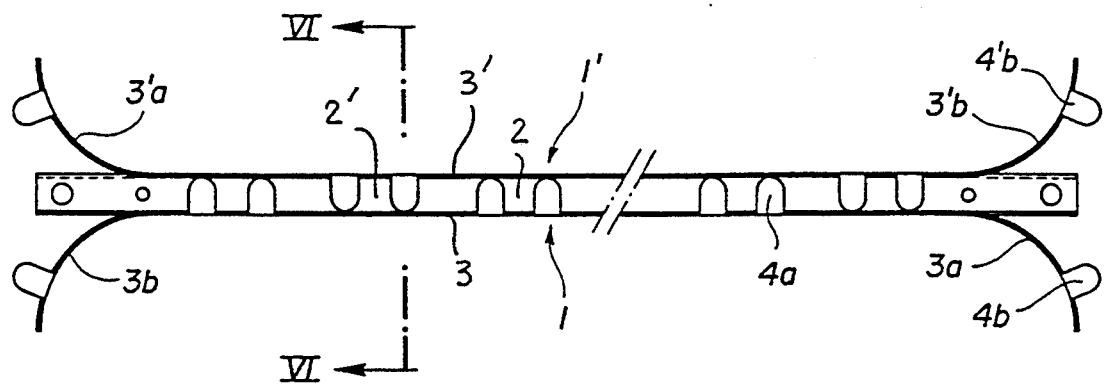
FIG. 4 is a front view of an assembly of two basic component constituting a cable support and guide rack.
Figure 5:
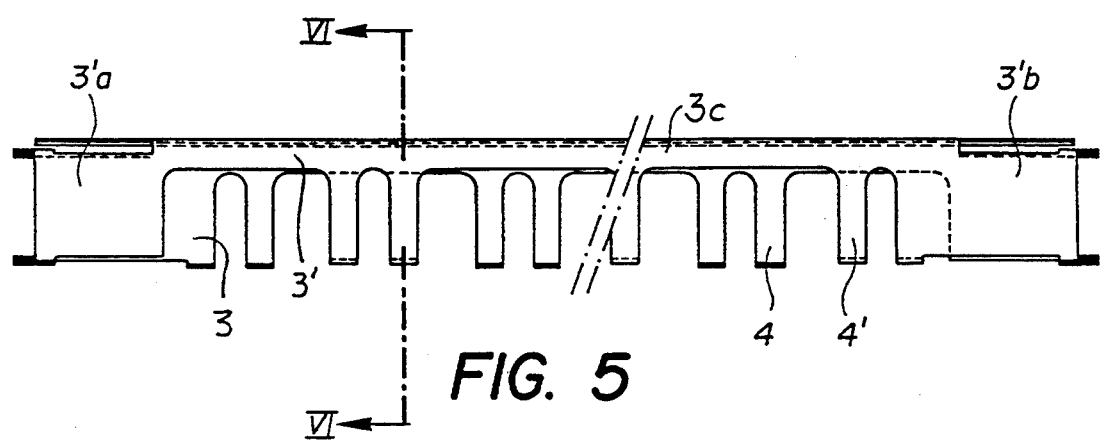
FIG. 5 is a plan view of the assembly shown in FIG. 4.

Referring to FIGS. 4 and 5, when two components 1 and 1' are assembled together with their longitudinal members 2 and 2' in contact and overlapping and their respective ends 3 and 3' placed one above the other, the curved end part 3a of one member 3 and the curved end part 3'b of the other member 3' are at the same end of the assembly and diverge in the direction towards their respective free ends.

The appendages 4 of the component 1 are then in a plane parallel to that of the appendages 4' of the component 1' with an alternate arrangement of the pairs of appendages of the two components when the assembly is viewed from above, as in FIG. 5.

Referring to FIG. 6, a tubular space 8 is delimited vertically between the respective central parts 3c and 3'c of the assembled components 1 and 1' and horizontally between the longitudinal members 2 and 2' and between the lips 4a and 4'a of the appendages 4 and 4' (the lips 4a of the appendages 4 of the component 1 being bent upwardly and the lips 4'a of the appendages 4' of the member 1' being bent downwardly).

FIG. 7 is a partial view of the two components 1 and 1' assembled together in the configuration just described to constitute a guide rack for optical cables fixed horizontally at the bottom of a subrack 9 fitted with a plurality of circuit boards 10 of which only one is shown in the drawing.

A bundle 11 of optical cables is guided in vertical trunking 12 disposed parallel to the front edge of a cabinet or rack (not shown) containing the subrack 9. A certain number of optical cables usually constituting so-called "optical jumpers" 13 or 13' enter or leave the trunking 12 at the level of the guide rack formed by the assembled components 1 and 1' and are guided towards or outside the tubular space 8 (FIG. 6) and bear, depending on whether the cables enter or leave said trunking from above or from below, against the curved end part 3'b or 3a of the respective component 1' or 1 which forms a deflector protecting the optical jumpers by preventing radii of curvature that are too small being imparted to the cables. Because FIG. 7 is a perspective view, only the jumpers 13' running from or to the bottom of the trunking can be seen but it is obvious that the jumpers 13 running from or to the top of the trunking follow an equivalent path against the curved part 3'b.

Although it cannot be seen in FIG. 7, note that the other end of the entirely symmetrical guide device fulfils exactly the same guiding and orientation functions.

The optical cables constituting the jumpers 13 and 13' are supported and guided in the tubular space 8 of the rack formed by the assembled components 1 and 1', between the members 4 of the lower component 1 which supports them and the members 4' of the upper component 1' which guide and retain them.

Each optical cable constituting the jumpers 13 or 13', such as the cable 14, can be easily extricated via the gap 5b between two consecutive non-associated members 4' of the component 1' and placed ready for connection with the connector part 15 fixed to its end resting between two associated members 4 of the component 1. Placing and removing the connector part 15 in and from this position are facilitated by the fact that, as mentioned above, the upstanding lips of the members 4 are rounded.

In the example shown in FIG. 7 the circuit board carries four spools 20 for winding optical fibers stacked in pairs. It is connected to four optical cables 17 of the jumpers 13 and 13' by respective optical connectors 16 in a manner that is known in itself. Note that the guide rack formed by the assembled components 1 and 1' prevents any tangling of the optical jumpers 13 and 13' connected to the board 10 and substitution of any of the cables 17 by the cable 14 placed in the waiting position, without risk of confusion. Fitting a removable cover 18 protecting the cables 17 and the optical connectors 16 on the front panel 19 of the board 10 is also facilitated by the guidance of the optical jumpers 13 and 13' in the rack, as are extraction or fitting of other boards 10 irrespective of their location relative to boards already fitted.

The distance between two consecutive non-associated members 4' (i.e. a wide gap 5b) is sufficiently large to enable work on one line without it being necessary to remove the cables of other lines and to place one or more cables in the rack without removing any part.

The cabinet 25 shown in FIG. 8 comprises a protective casing 22 in which are mounted two racks 23 each containing two subracks 9a and 9b. Support and guide racks 21 in accordance with the invention in the embodiment just described are mounted horizontally between two superposed subracks 9a and 9b or at the bottom of each of the two lower subracks 9b, in either case at a level slightly lower than that of the bottom of the front panel of each subrack.

Schematically represented inside each of the subracks are the front panels of two circuit boards 10 each connected through four cables brought out from the guide space of the respective rack 21 via a gap near the front panel of the board in question.

The cabinet 25 also comprises a subrack 24 for coiling optical fibers to provide a reserve for each individual optical fiber entering or leaving the cabinet in one of said cables, both for purposes of link operation and for purposes of any repairs that might be necessary.

Note that the optical cables are perfectly guided and stowed and that it is possible to work on any of the boards 10 fitted to the subracks without impediment by the cables connected to the other boards of the same subrack or the subrack above or below the subrack in question.

Although the invention has been described hereinabove with reference to a specific embodiment, by way of non-limiting example, this embodiment may be varied without departing from the scope of the invention.

For example, the shape of the appendages 4 together with their number and their relative disposition could be different than those indicated in the above description. Specifically, each group of two associated appendages 4 could be replaced by a single appendage (although this would eliminate the possibility of placing a connector part 15 between two associated appendages 4) or each group could comprise a number of associated appendages 4 other than two, for example three or four.

There is claimed:

1. A windowed cable guide and support device for supporting and guiding cables conveying electrical or light signals, said device comprising a plurality of components, each having a common elongate part and a series of longitudinally separated, parallel coplanar elongate cable support members having one end joined to said common elongate part of said component and an opposite free end and extending perpendicular to the length of said component and at right angles to the common elongate part, said support members being disposed on a common side of the common part, and said components being assembled together in pairs with their respective cable support members to define an elongate tubular space for receiving said cables extending longitudinally through said tubular space and with the respective cable support members being spaced from each other, extending parallel to each other, and being longitudinally offset so as to alternate longitudinally from component to component;

wherein said common elongate part comprises an elongate flat longitudinal member and a second member having a flat central part and two ends which curve out of the plane of said flat central part, wherein one edge of said flat central part is joined at right angles to an edge of said elongated flat longitudinal member, and another edge of said flat central part is joined in the same plane to said cable support members.

2. Device according to claim 1 wherein said cable support members constitute pairs with relatively narrow gaps between said cable support members of each pair and relatively large gaps between consecutive pairs of said cable support members.

3. Device according to claim 1 wherein the free ends of said cable support members are bent at right angles over a length equal to the width of said longitudinal member in the same direction as said longitudinal member to form hooks.

4. A windowed cable guide and support device for supporting and guiding cables conveying electrical or light signals, said device comprising a plurality of components, each having a common elongate part and a series of longitudinally separated, parallel coplanar elongate cable support members having one end joined to said common elongate part of said component and an opposite free end and extending perpendicular to the length of said component and at right angles to the common elongate part, said support members being disposed on a common side of the common part, and said components being assembled together in pairs with their respective cable support members to define an elongate tubular space for receiving said cables extending longitudinally through said tubular space and with the respective cable support members being spaced from each other, extending parallel to each other, and being longitudinally offset so as to alternate longitudinally from component to component; wherein each of said components has a curved surface at at least one end thereof.

5. Device according to claim 4 wherein said components are two in number and identical, and said support members are disposed asymmetrically along each component relative to the center thereof and said two components are assembled together in mirror image facing position to cause their respective cable support members to alternate.

6. Device according to claim 4 wherein the free ends of at least some of the cable support members comprise means for limiting lateral displacement of cables disposed in the lengthwise direction of the component bearing against the part of said support members between free end and their end joined to the common elongate part of said component.

* * * * *